Oct. 18, 1966  M. L. HART  3,279,376
PROPORTIONING APPARATUS
Filed Sept. 23, 1964

INVENTOR.
MERIDA L. HART
BY
Dunlap & Laney
ATTORNEYS

Oct. 18, 1966  M. L. HART  3,279,376
PROPORTIONING APPARATUS
Filed Sept. 23, 1964
3 Sheets-Sheet 2

INVENTOR.
MERIDA L. HART
BY
Dunlap & Janney
ATTORNEYS

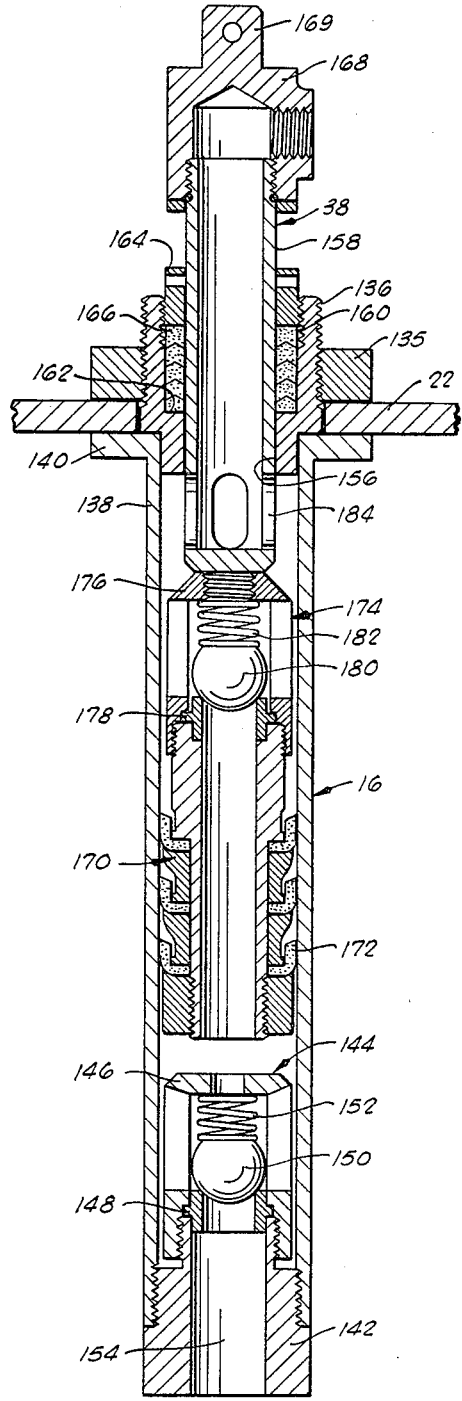
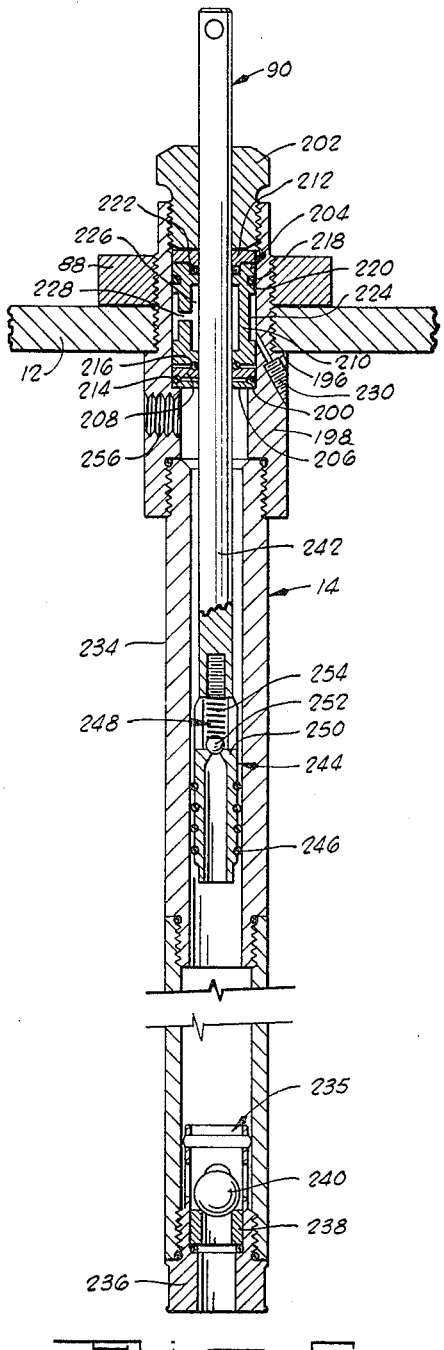

United States Patent Office 3,279,376
Patented Oct. 18, 1966

3,279,376
PROPORTIONING APPARATUS
Merida L. Hart, P.O. Box 779, Hobart, Okla.
Filed Sept. 23, 1964, Ser. No. 398,573
3 Claims. (Cl. 103—11)

This invention relates to improvements in proportioning apparatus. More particularly, but not by way of limitation, this invention relates to an improved dual pump device incorporating proportioning mechanism interconnecting the pumps whereby the fluid discharged from one pump will be proportional to the quantity of fluid discharged from the other pump.

Due to increasing use of materials which must be mixed immediately prior to application by the ultimate user, it has become necessary to provide some means for proportioning and mixing such materials on the job site. Naturally, very small quantities of materials may be mixed and proportioned manually. However, where the quantity of such materials to be used is extremely large, it is desirable, if not necessary, to be able to mix and proportion such materials continuously and automatically.

One example of a material which is proportioned and mixed during the application of the material is an Epon Foam spray manufactured by the Shell Chemical Company. The Epon Foam spray is a two component system consisting of an Epon Foam spray resin and an Epon Foam spray curing agent or catalyst. The Epon Foam spray is used to form a thermoinsulating material which may be applied, for example, to the interior of refrigerated vans or trailers or to any vessel in which it is desired to control heat transfer through the walls. It has been found in using the Epon Foam that the insulation value, degree of adhesion, strength properties, and the expected service life of the material depend upon the maintenance of a proper ratio between the resin and the curing agent and the extent of mixing of the two. From the foregoing, it can be appreciated that it is essential that apparatus used to proportion the catalyst and resin must continuously and accurately maintain such a ratio.

It has also been found highly desirable to be able to vary the relative proportion between the resin and the catalyst. Such adjustability is desirable when changing from one type of material to another. Also, when using only one type of material the setting or curing time of the material may be varied by changing the ratio of the catalyst and resin.

Many materials, including the aforementioned example, have a relatively limited effective life prior to mixing when they are exposed to the atmosphere. In view of the relatively high cost of such materials, it is also a desirable feature to provide apparatus that can utilize the original containers in which the material is supplied. Furthermore, a considerable loss of material occurs when the materials must be transferred from the original containers into reservoirs which are provided with the proportioning apparatus.

In one aspect, this invention contemplates an improved proportioning system that includes a frame member holding a pair of reciprocating pumps in spaced parallel relationship, driving means connected with one of the pumps, a lever pivotally connected with the driving means and extending therefrom into connection with the other said pump, and a fulcrum mounted on the frame in engagement with the lever whereby movement of the driving means and one pump will cause the other pump to be driven in an opposite direction and moved a distance proportional to the distance that the driving means moves.

In another aspect, this invention contemplates an improved proportioning apparatus for use in connection with two spaced parallel reciprocating members. A frame is provided which retains the reciprocating members in parallel spaced relation. A fulcrum member is engageable with a lever that extends from a pivotal connection with one of the reciprocating members to a pivotal and sliding connection with the other reciprocating member, whereby movement of the reciprocating member pivotally connected with said lever will cause an opposite and proportional movement of the other reciprocating member.

One object of the invention is to provide an improved proportioning apparatus wherein one of a pair of spaced parallel reciprocating members can be caused to move a distance proportional to the movement of the other reciprocating member.

Another object of the invention is to provide an improved proportioning system for use with spaced parallel reciprocating members wherein the ratio of movement between the reciprocating members can be selectively varied.

Still another object of the invention is to provide a proportioning apparatus for use with a pair of spaced parallel reciprocating pumps wherein the output of one of the pumps will be proportional to the output of the other pump.

A further object of the invention is to provide an improved proportioning apparatus for use with a pair of parallel spaced reciprocating pumps wherein the ratio of the output of the pumps can be selectively varied.

A still further object of the invention is to provide a proportioning apparatus including a pair of parallel spaced reciprocating pumps that are arranged so that the original shipping containers for the materials to be proportioned can be utilized.

One other object of the invention is to provide an improved proportioning apparatus including a pair of parallel spaced reciprocating pumps that is light in weight and easily transportable.

The foregoing and additional objects and advantages of the invention will become more apparent as the following description is read in conjunction with the accompanying drawing wherein like reference characters denote like parts in all views and wherein:

FIG. 4 is a cross-sectional view of a pump which can be utilized in connection with the proportioning device of FIG. 1;

FIG. 5 is a cross-sectional view illustrating the structure of another pump which can be utilized with the proportioning device of FIG. 1.

Figure 1:
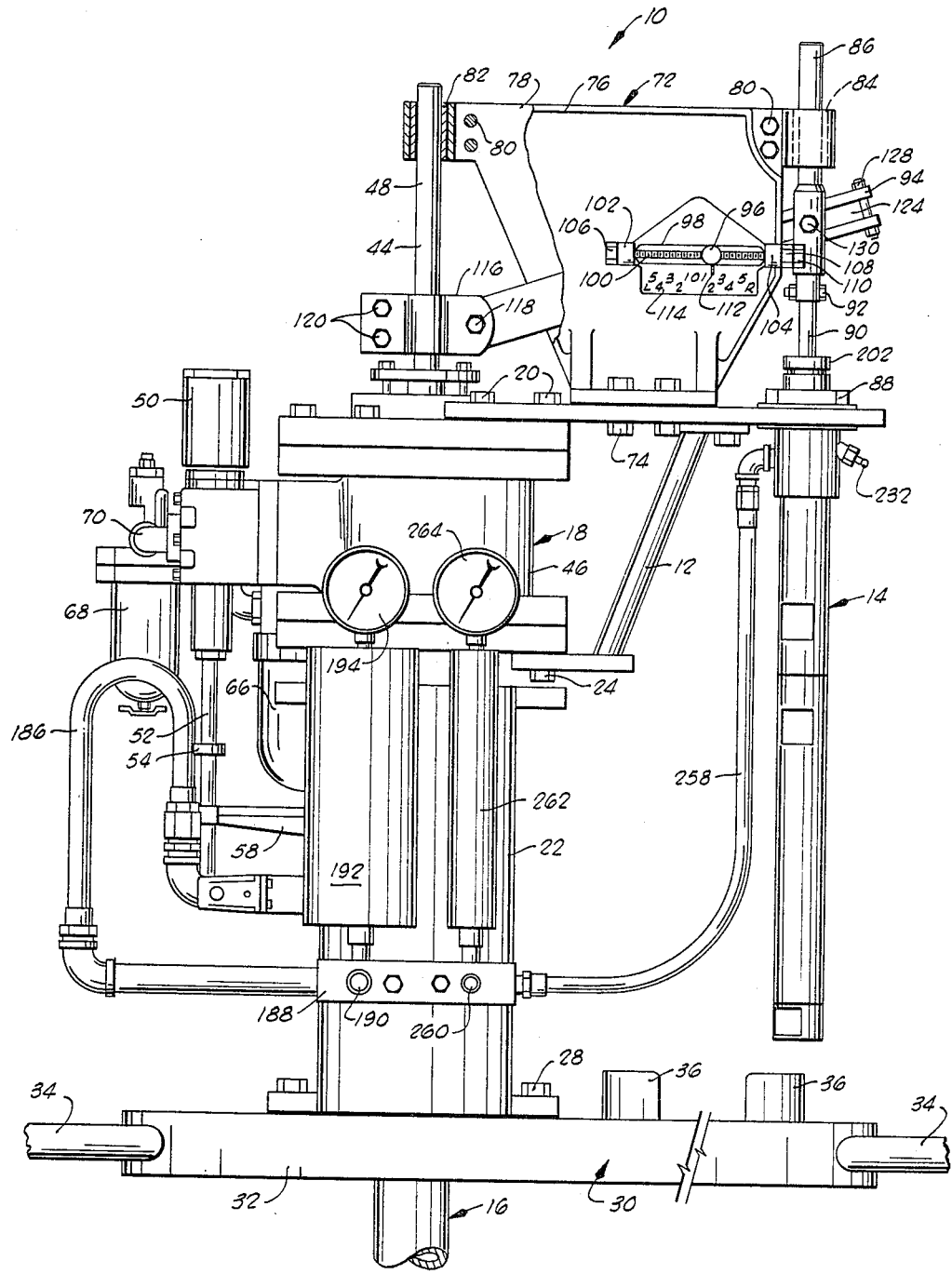
FIG. 1 is a front elevation view of a proportioning device constructed in accordance with one aspect of the invention.
Figure 2:
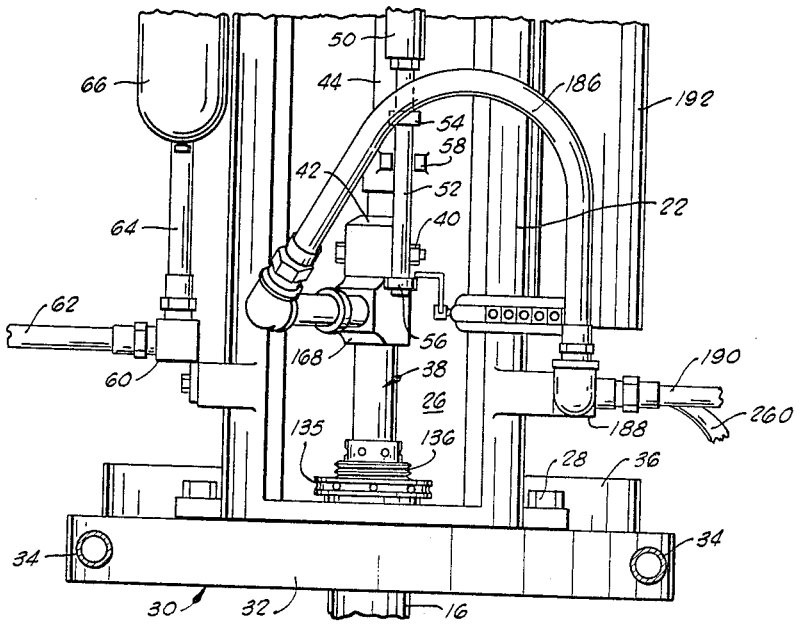
FIG. 2 is a partial side elevation view of the proportioning device of FIG. 1.

Referring now to the drawing and to FIGS. 1 and 2 in particular, shown therein and generally designated by the reference character 10, is a proportioning device constructed in accordance with the invention. As shown in FIG. 1, the proportioning device 10 includes a frame 12 supporting a catalyst pump 14 and a resin pump 16 in parallel spaced relationship. The frame 12 is connected with an air motor 18 by means of threaded fasteners 20. The frame 12 is also connected with a lower frame casting 22 by one or more threaded fasteners 24.

The lower frame casting 22 is a hollow cylindrical member that encircles the lower portion of the air motor 18 and the upper portion of the resin pump 16 and has an opening 26 extending longitudinally along one side as shown more clearly in FIG. 2. The lower frame casting 22 is connected at its upper end by fasteners (not shown) with the lower end of the air motor 18. The lower end of the lower frame casting 22 is connected by a plurality of fasteners 28 with a pump support 30.

The pump support 30 includes a lower frame portion 32 which is provided with spaced handles 34 at each end thereof. The pump support 30 also includes a pair of spaced arcuate brackets 36 mounted on the upper surface thereof for purposes which will become more apparent hereinafter.

The terms "catalyst" and "resin" as used in connection with the pumps 14 and 16, are not intended to limit the use or structure of the pumps, but are used to more clearly identify and distinguish the pumps.

As shown most clearly in FIG. 2, a reciprocating member 38 of the resin pump 16 is connected by a fastener 40 with the lower exposed end 42 of a piston shaft 44 of the air motor 18. The shaft 44 is fixed to a reciprocally mounted piston (not shown) which is installed within the cylindrical housing 46 of the air motor 18. In FIG. 1, an upper end 48 of the piston shaft 44 can be seen extending upwardly from the air motor 18.

The air motor 18 is of conventional construction and includes a selector or control valve 50 which is mounted on the cylindrical housing 46 of the air motor 18. The selector valve 50 is also of conventional construction and includes a movable valve member 52 which projects downwardly from the valve 50 and carries a pair of spaced abutments 54 and 56 (see FIG. 2). The abutments 54 and 56 are engageable with a valve actuator 58 which is mounted on the lower end 42 of the piston shaft 44.

An air supply (not shown) is connected with an air manifold block 60 by means of a conduit 62. A conduit 64 extends from the air manifold block 60 to a filter 66 which is connected with a conventional lubricator 68. The lubricator 68 is connected with the valve 50 by a pipe fitting 70. The filter 66 and lubricator 68 are not required, but may be used if desired. The purpose of the filter 66 is to remove moisture from the air to prevent internal corrosion of the valve 50 and the air motor 18. The lubricator 68 is provided to inject a small quantity of a lubricant into the air line to assure the proper lubrication of the moving parts of the valve 50 and of the air motor 18 and to reduce friction to the minimum therein.

As shown in FIG. 1, an upper frame portion 72 is attached to the frame 12 by means of threaded fasteners 74. The upper frame portion 72 includes front and rear frame members 76 and 78 respectively. The front and rear frame members 76 and 78 are connected by a plurality of threaded fasteners 80 which also provide sufficient pressure between the members 76 and 78 to retain bushings 82 and 84 therebetween. The bushing 82 encircles the upper end 48 of the air motor piston shaft 44 and the bushing 84 encircles a catalyst pump yoke 86. As constructed, the upper frame portion 72, in cooperation with the bushings 82 and 84, supports the upper end 48 of the piston shaft 44 and pump yoke 86 in spaced, parallel relationship.

The catalyst pump 14, as previously mentioned, is mounted on the frame 12 and is fixed thereto by a threaded nut 88. The catalyst pump 14 is mounted directly beneath the bushing 84 and includes a reciprocating member 90 which is connected with the catalyst pump yoke 86 by a threaded fastener 92.

The front and rear frame members 76 and 78, respectively, are spaced to permit a lever 94 to extend therebetween. An adjustable fulcrum member 96, which cooperates with the lever 94, as will be described more fully hereinafter, is positioned in mating slots 98 in the front and rear frame members 76 and 78 and is mounted on a threaded screw 100 which extends through lugs 102 and 104. The threaded screw 100 is provided with an enlarged head 106 at one end and with a pair of threaded nuts 108 and 110 at the other end which permit rotation of the screw 100 to position the fulcrum 96 at any selected position along the screw 100 within the slot 98. The fulcrum 96 carries a pointer 112 which operates in conjunction with a series of graduations 114 to indicate the relative movement between the piston shaft 44 and the reciprocating member 90 of the catalyst pump 14 or the relative output of the pumps 14 and 16. The fulcrum 96 and slot 98 are located in approximately the center of travel of the lever 94.

Figures 3, 6:
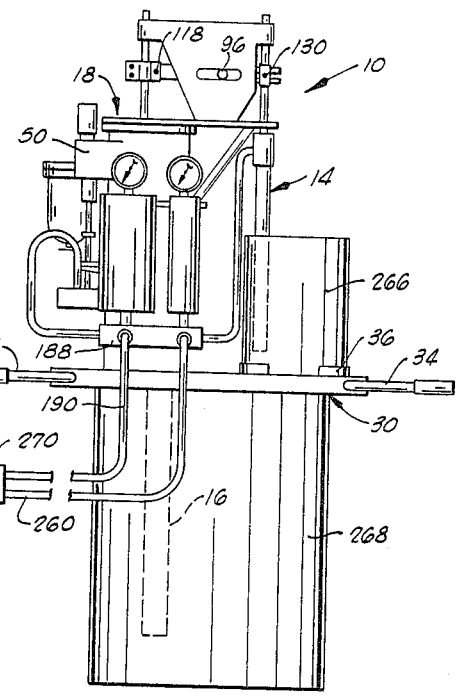
FIG. 3 is a reduced view partly in elevation and partly in cross-section illustrating the structure of a lever mechanism used in constructing the proportioning device of FIG. 1.
FIG. 6 is an elevation view showing the proportioning device of FIG. 1 as utilized in connection with large and small shipping containers and with a mixing head.

As illustrated in FIGS. 1 and 3, the lever 94 is pivotally connected with a clamp 116 by a pivot pin 118. The clamp 116 is of the split type having identical front and rear sections which are held together and securely engage the piston 44 by threaded fasteners 120. The lever 94 is provided with a slot 122 near the medial portion thereof and a slot 124 on the end opposite the pivot pin 118. The slot 122 cooperates with a roller 126 which is rotatably positioned on the fulcrum 96. The slot 122 and the roller 126 cooperate to permit both a pivoting and sliding movement between the lever 94 and the fulcrum 96. The slot 124 may extend through the end of the lever 94, as shown, or may, if desired, be formed completely within the lever 94. As illustrated, the end of the slot 124 is closed by a fastener 128. A pivot pin 130 extends through the catalyst pump yoke 86 passing through the slot 124. The pin 130 carries a roller 132 which cooperates with the slot 124 to provide both a pivoting and sliding movement between the lever 94 and the catalyst pump yoke 86. As may be more clearly seen in FIG. 3, the lever 94 extends through a slot 134 which is formed in the catalyst pump yoke 86.

As shown in FIGS. 2 and 4, the resin pump 16 is mounted in the lower frame casting 22 by a threaded nut 135 which threadedly engages a packing gland body 136. The packing gland body 136 is threadedly connected with a resin pump body 138 which has a flange 140 thereon. Tightening of the nut 135 against the upper surface of the lower frame casting 22 pulls the flange 140 securely against the lower surface of the lower frame casting 22.

An adapter 142 is screwed into the lower end of the pump body 138 and carries a standing valve 144. The standing valve 144 includes a valve cage 146 which is threadedly attached to the adapter 142, a valve seat 148 which is retained in the valve 144 between the valve cage 146 and the adapter 142, and a valve ball and spring 150 and 152, respectively. The arrangement of the standing valve 144 is such that fluid may flow upwardly into the pump 16 through a passageway 154 provided in the adapter 142 through the valve seat 148 and into the pump body 138 above the standing valve 144, but fluid flow in the opposite direction is prevented by the engagement of the valve ball 150 with the seat 148.

As previously mentioned, the upper end of the pump body 138 is attached to a packing gland body 136. The packing gland body 136 has a bore 156 which closely encircles the exterior of a tubular connecting member 158 of the reciprocating member 38. The packing gland body 136 is also provided with a counterbore 160 which provides an upwardly facing shoulder 162 therein. A packing gland nut 164 threadedly engages the packing gland body 136 around the counterbore 160 and is arranged to compress a chevron type packing 166, which is disposed in the counterbore 160, between the packing gland nut 164 and the upwardly facing shoulder 162. Compressing the packing 166 forms a fluid-tight seal about the tubular connecting member 158 of the reciprocating member 38.

The reciprocating member 38 includes, in addition to the tubular connecting member 158, a discharge member 168 which is threadedly connected to the upper end of member 158 and is arranged at 169 for connection with the lower exposed end 42 of the shaft 44, and a hollow piston member 170 which is connected to the lower end of the connecting member 158 and is reciprocally disposed within the pump body 138 above the standing valve 144. The piston 170 is provided with a plurality of sealing rings 172 which encircle the piston 170 and form a fluid-tight seal with the pump body 138.

A traveling valve 174 is disposed in the upper end of the piston 170 and includes a valve cage 176, a valve seat 178, and a valve ball and valve spring, 180 and 182, respectively. The traveling valve 174, like the standing valve 144, is arranged to permit fluid flow upwardly through the piston 170 into the pump body 138 above the traveling valve 174. The hollow tubular connecting member 158 is provided with a plurality of ports 184 near the lower end thereof permitting communication from the interior of the pump body 138 above the traveling valve 174 through the interior of the tubular connecting member 158 and into the discharge member 168.

Referring briefly to FIGS. 1 and 2, it can be seen that the discharge member 168 is connected by means of an arrangement of pipe fittings and by a flexible conduit 186 to a discharge manifold 188 which is mounted on the lower frame casting 22. The manifold 188 provides a connection from the flexible conduit 186 to a flexible discharge conduit 190 and also provides communication with a hollow cylindrical surge chamber 192 which is provided to absorb a portion of the surges produced by the reciprocating pump 16. Mounted on top of the surge chamber 192 is a gage 194 which is in communication with the interior of the chamber 192 and is provided to permit monitoring of the discharge pressure of the pump 16.

As previously described, the catalyst pump 14 is retained in the frame 12 between the nut 88 and the upwardly facing shoulder 196 which is formed on the exterior of the combined packing gland housing and discharge member 198. The interior of the packing gland member 198 is counterbored to provide an upwardly facing shoulder 200 and has the upper end of the counterbore threaded to receive a threaded packing nut 202 which closely encircles the reciprocating member 90. The packing gland 204 is received in the counterbore between the packing gland nut 202 and the upwardly facing shoulder 200.

The packing gland 204 includes a lower packing support member 206 disposed adjacent the upwardly facing shoulder 200 and encircling the reciprocating member 90, a compression plate 208, a packing gland body 210 disposed above the compression plate 208 and encircling the reciprocating member 90, an upper compression plate 212 encircling the reciprocating member 90 and disposed between the packing body 210 and the packing gland nut 202. An annular packing ring 214 is disposed between the support member 206 and the compression member 208 and in engagement with the packing gland body 198 providing a fluid-tight seal therewith. An annular packing ring 216 is disposed between the packing body 210 and the compression ring 208 in engagement with the reciprocating member 90 forming a fluid-tight seal therewith. An annular packing ring 218 is disposed in an annular groove 220 formed in the upper exterior of the packing body 210 in sealing engagement with the packing gland body 198. An annular seal ring 222 is disposed between the compression member 212 and the packing gland body 210 in engagement with the reciprocating member 90 forming a fluid-tight seal therewith. The arrangement of the various components of the packing gland 204 is such that movement of the packing gland nut 202 toward the upwardly facing shoulder 200 compresses or deforms the various seal rings into sealing engagement with the adjacent members.

The packing body 210 also includes an annular groove 224 which, when the packing body 210 is inserted in the packing gland 198, forms an outer annular chamber encircling the packing body 210. An annular groove 226 is also formed in the packing body 210 adjacent the reciprocating member 90 forming an inner annular chamber therewith. One or more passageways 228 extend between the annular grooves 224 and 226 providing communication therebetween. A partially threaded passageway 230 extends from the exterior of the member 198 into conmnuication with the annular groove 224. The passageway 230 is arranged to accept a lubricating fitting 232 as shown in FIG. 1. The lubricating fitting 232 is provided so that a common lubricating gun (not shown) can be connected thereto and a lubricant introduced into the chambers formed by the annular grooves 224 and 226 to provide a lubricant seal.

The catalyst pump 14 includes a pump body 234 which is threadedly connected to the lower end of the member 198. The lower end of the pump body 234 is provided with a standing valve 235 which includes valve cage 236 supporting a valve seat 238. Mounted within the cage 236 is a valve ball 240 which is adapted to move off the seat 238 to permit flow through the standing valve 235 into the interior of the valve body 234 but to prevent flow in the opposite direction.

The reciprocating member 90 includes a connecting rod 242 which has a piston 244 attached to the lower end thereof. The piston 244 is reciprocally mounted within the pump body 234 above the standing valve 235. The piston 244 is a hollow member having a plurality of annular sealing rings 246 encircling the exterior thereof in sealing engagement with the interior of the body 234.

A traveling valve 248 is located in the piston 244 adjacent the connecting rod 242. The traveling valve 248 includes a seat 250, a valve ball 252 arranged to engage the seat 250, and a valve spring 254 which is arranged to bias the valve ball 252 toward the seat 250. The arrangement of the traveling valve 248 is such that fluid can flow upwardly through the piston 244 moving the ball 252 off the seat 250 to permit fluid to flow into the upper portion of the pump body 234 and into the discharge member 198.

The discharge member 198 is provided with a threaded outlet 256 into which suitable fittings are screwed. A conduit 258 (see FIG. 1) extends from the pump 14 to the manifold 188. As shown in FIG. 1, the manifold 188 provides communication from the conduit 258 into a discharge conduit 260. Communication is also provided in the manifold 188 between the conduit 258 and a surge chamber 262. The surge chamber 262 serves the same purpose as the chamber 192 used in connection with the resin pump 16. The surge chamber 262 has a gage 264 mounted thereon in communication with the interior of the chamber so that the discharge pressure of the pump 14 can be monitored.

FIG. 6 illustrates the use of the proportioning apparatus 10 with the catalyst pump 14 disposed in a container or reservoir 266, which is preferably the 5 gallon container in which the catalyst is packaged. As illustrated, the proportioning apparatus 10 and the reservoir 266 are supported by the pump support frame 30 which is situated on a large reservoir 268, such as a 55 gallon drum, which may contain the resin and has the resin pump 16 disposed therein. The outlet conduit 190, which has one end connected with the resin pump 16 by way of the manifold 188, has its opposite end connected with a mixing head 270. The outlet conduit 260 which extends from the catalyst pump 14 by way of the manifold 188 also has its opposite end connected with the mixing head 270. The mixing head 270, which is of a conventional type suitable for mixing the particular materials proportioned by the apparatus 10, will generally include a means, such as a valve and nozzle (not shown), for controlling the discharge of the mixed materials.

*Operation*

Assuming for the purpose of explanation, that the materials to be mixed are a resin and a catalyst and that they are to be mixed in a ratio by weight of one part catalyst to 20 parts resin. If the volumetric output per stroke from the catalyst pump 14 is exactly 1/20 of the output per stroke of the resin pump 16, it can be seen that the only adjustment in ratio between the two pumps that need be made is to compensate for differences in density of the materials being pumped. With the fulcrum 96 positioned so that the indicator 112 is at the zero mark of the graduations 114, the pivot pins 118 and 130 will be equi-distant from the fulcrum 96 when the lever 94 is in a horizontal position. Assuming that the catalyst has a density of 13.2 lbs. per gallon and the resin has a density of 10.2 lbs. per gallon, it can be seen that an adjustment must be made to compensate for the 3 lbs. differential in density. To reach the desired ratio, it will be necessary to move the fulcrum 96 along the screw 100 and slot 98 toward the pivot 130 of the catalyst pump 14. The fulcrum 96 is moved by rotating the screw 100 in a counterclockwise direction until the fulcrum 96 has reached the desired point. The fulcrum 96 can be adjusted until the exact ratio of 1 part to 20 parts is reached, the relative weights being best determined by operating the pumps 14 and 16 an equal number of times and weighing the output from each. If the proportioning apparatus 10 is always to be used with the same material, graduations can be provided which will indicate directly the ratio by weight or volume as desired.

To operate the proportioning apparatus 10, air under pressure is supplied through the conduit 62 to the manifold 60 through the conduit 64 and the filter 66 and lubricator 68 into the valve 50. The valve 50 is ported to direct the air to one side or the other of the reciprocating piston (not shown) mounted in the air motor 18. The side of the piston to which the air is directed is determined by the position of the valve member 52 which is positioned by the valve actuator 58 in response to the movement of the piston shaft 44. The valve 50 is also ported to permit the discharge of air from the low pressure side of the piston while directing the high pressure air to the opposite side of the piston. Upward movement of the piston shaft 44 lifts the reciprocating member 38 and the piston 170 attached thereto upwardly in the resin pump 16. As the piston 170 moves upwardly, the traveling valve 174 closes and the standing valve 144 opens due to the reduction in pressure below the piston 170, thereby pulling resin through the passageway 154, through the valve 144, and into the pump body 138 below the piston 170.

Simultaneously, the clamp 116 travels upwardly with the piston shaft 44 carrying one end of the lever 94 upwardly and pivoting the lever 94 about the fulcrum 96. Due to the linear travel of the pivot pin 118, the relative distance between the fulcrum 96 and the pivot pin 118 changes and the lever also moves a short distance longitudinally with the fulcrum 96 moving in the slot 122. The upward movement of the pivot pin 118 results in the downward movement of the pivot 130, and due to the linear travel of the pivot 130, a small relative longitudinal movement must also occur between the pivot 130 and the lever 94. If the pivot pin 130 were not permitted to move longitudinally in the slot 124, the pivot pin 130 would attempt to describe an arc, resulting in severe wear in the reciprocating member 90 of the catalyst pump 14 or in the pump becoming stuck, resulting in a failure of the entire system. It has been found experimentally that even though a small longitudinal movement occurs at the fulcrum 96 and at the pivot pin 130, the ratio of the output of the catalyst pump 14 as compared with the output of the resin pump 16 will not vary more than one or two percent from the precise ratio desired. Furthermore, over one complete pump stroke the actual output ratio will average to be extremely close to the desired ratio.

With the upward movement of the pivot pin 118, the pivot pin 130 is driven downwardly carrying the catalyst pump yoke 86 and the reciprocating member 90 downwardly in the catalyst pump 14. Downward movement of the reciprocating member 90 moves the piston 244 downwardly therein, closing the standing valve 235 and simultaneously opening the traveling valve 248 carried by the piston 244. Fluid in the pump body 234 will then travel upwardly through the piston 244 and the traveling valve 248 into the upper portion of the pump body above the piston 246.

As the piston shaft 44 reaches the upper end of its travel, the valve actuator 58 engages the upper abutment 54 to carry the valve member 52 upwardly in the valve 50 and thereby direct the air to the upper surface of the air motor piston. The application of pressurized air to the upper surface of the piston causes a downward movement of the piston in the air motor 18, driving the piston shaft 44 downwardly. Movement of the piston shaft 38 downwardly drives the reciprocating member 38 of the resin pump 16 downwardly in the pump body 138 closing the standing valve 144 and displacing fluid from between the piston 170 and the standing valve 144 upwardly through the traveling valve 174 into the upper portion of the pump body 138.

The direction of movement of the reciprocating member 90 in the catalyst pump 14 is also reversed, that is, the reciprocating member 90 moves upwardly closing the traveling valve 248 and carrying fluid in the pump body above the piston 244 upwardly and out through the discharge port 256 and through the conduit 258 to the manifold 188. At the same time, the standing valve 235 opens to permit additional catalyst to flow upwardly therethrough into the lower portion of the pump body 234 below the pump piston 244.

Another feature of the invention, which should be pointed out, is the packing gland 204 (see FIG. 5). While described in connection with the structure of the resin pump 14, it can be appreciated that the packing gland 204 could be used to advantage to seal any reciprocating member.

The gland 204 provides a double mechanical seal between the packing body 210 and the reciprocating member 90 due to the deformation of the spaced seal or packing rings 214, 216, 218, and 222. Furthermore, filling the annular groove 224 and 226 with lubricant under pressure forms an effective seal between the packing body 210 and reciprocating member 90. The lubricant reduces the friction in the pump and also serves as a buffer zone between the environment surrounding the pump 14 and the materials contained within the pump.

It can be seen from the foregoing detailed description that the proportioning apparatus described herein provides a simple, economical, easily portable apparatus for accurately and efficiently proportioning two materials. Furthermore, it provides a means of utilizing the shipping containers as a reservoir for the materials to avoid the loss which occurs when transferring the materials from one container to another as well as avoiding undue exposure of the materials to atmospheric conditions.

It should be understood that the single embodiment described in detail hereinbefore is presented by way of example only and that many changes and modifications can be made thereto without departing from the spirit of the invention or from the scope of the annexed claims.

What I claim is:
1. Proportioning apparatus comprising:
    a frame;
    first and second pump means mounted on said frame in parallel-spaced relation, each said pump means including
        a pump cylinder,
        a reciprocating member positioned in said cylinder,
        a first one-way valve mounted in the lower end of said pump cylinder arranged to permit fluid to flow into the cylinder and to prevent flow in the opposite direction,
        a second one-way valve in the reciprocating member arranged to permit flow through said pump cylinder relatively away from said first one-way valve and to prevent flow in the opposite direction, outlet means in communication with the interior of said cylinder through which fluid can be discharged from said cylinder, and packing means connected with said cylinder and slidingly and sealingly engaging said reciprocating member, at least one of said packing means including a packing body having an upwardly facing shoulder therein, a support plate encircling said reciprocating member engaged with the upwardly facing shoulder in said packing body, a lower compression plate encircling said reciprocating member, a seal member disposed between said support plate and compression plate and in sealing engagement with said packing member body, a tubular body member encircling said reciprocating member, said body member having an inner annular chamber adjacent said reciprocating member, an outer annular chamber adjacent said packing body, and at least one passageway connecting said annular chambers, a seal member disposed between the lower end of said tubular body member and compression plate and in sealing engagement with said reciprocating member, a seal member carried by the upper end of said tubular body member in sealing engagement with said packing body, an upper compression plate encircling said reciprocating member, a seal member disposed between said compression plate and the upper end of said tubular body member and in sealing engagement with said reciprocating member, means encircling said reciprocating member for retaining said packing member in said pump means, and a fluid filling said annular chambers;

driving means operably connected with the reciprocating member of said first pump means;

a lever having one end pivotally connected to said driving means and having the other end slidingly and pivotally connected with the reciprocating member of said second pump means; and, fulcrum means adjustably positioned on said frame and engaged with said lever intermediate the ends thereof, whereby the reciprocating member of said second pump means is moved by said driving means in proportion to the distance of each from said fulcrum means.

2. Proportioning apparatus comprising:

a frame;

first and second pump means mounted on said frame in parallel spaced relation, each said pump means having a reciprocating member positioned therein;

driving means operably connected with the reciprocating member of said first pump means;

a lever having one end pivotally connected to said driving means and having the other end slidingly and pivotally connected with the reciprocating member of said second pump means;

fulcrum means adjustably positioned on said frame and engaged with said lever intermediate the ends thereof, whereby the reciprocating member of said second pump means is moved by said driving means in proportion to the distance of each from said fulcrum means;

a relatively large fluid reservoir;

a small fluid reservoir; and, a pump support member connected with said first pump means and located on said large fluid reservoir with a portion of said first pump means disposed in said large reservoir, said support member including means supporting said small fluid reservoir with a portion of said second pump means disposed in said small reservoir.

3. Packing means for a pump including a pump cylinder having an upwardly facing shoulder therein, a pump piston reciprocally mounted in said cylinder and a piston rod connected with the piston and extending from the cylinder, said packing means comprising:

a support plate encircling said reciprocating member and engaged with the upwardly facing shoulder in the pump cylinder;

a lower compression plate encircling said reciprocating member;

a seal member disposed between said support plate and compression plate and in sealing engagement with the pump cylinder;

a tubular body member encircling said reciprocating member, said body member having an inner annular chamber adjacent said reciprocating member, an outer annular chamber adjacent the pump cylinder, and at least one passageway connecting said annular chambers;

a seal member disposed between the lower end of said tubular body member and compression plate and in sealing engagement with said reciprocating member;

a seal member carried by the upper end of said tubular body member in sealing engagement with the pump cylinder;

an upper compression plate encircling said reciprocating member;

a seal member disposed between said upper compression plate and the upper end of said tubular body member and in sealing engagement with said reciprocating member;

means encircling said reciprocating member for retaining said packing means in the pump cylinder; and, a fluid filling said annular chambers.

References Cited by the Examiner

UNITED STATES PATENTS

| 27,218 | 2/1860 | Hanson | 103—38 |
|---|---|---|---|
| 460,696 | 10/1891 | Windhausen | 277—15 |
| 580,049 | 4/1897 | Notberg et al. | 277—15 |
| 2,048,736 | 8/1936 | Esser | 103—11 |
| 2,281,777 | 5/1942 | Madsen et al. | 103—38 X |
| 2,479,711 | 8/1949 | Arutunoff | 277—37 |
| 2,480,055 | 8/1949 | Seaton | 277—9 |
| 2,548,807 | 4/1951 | Morgan et al. | 103—38 X |
| 2,660,458 | 11/1953 | Collins et al. | 277—79 X |
| 2,752,989 | 7/1956 | Jenkins | 103—38 |
| 2,925,780 | 2/1960 | Tear | 103—11 |
| 2,945,709 | 7/1960 | Freed et al. | 277—9 |
| 3,147,983 | 9/1964 | Meuman et al. | 277—50 |

MARK NEWMAN, *Primary Examiner.*

SAMUEL LEVINE, *Examiner.*

W. L. FREEH, *Assistant Examiner.*